June 26, 1934.  L. MOLLENKAMP  1,964,327

GRAIN DRAG RADDLE

Filed May 25, 1932  2 Sheets-Sheet 1

Inventor
Louis Mollenkamp

By Clarence A. O'Brien
Attorney

Inventor
Louis Mollenkamp

Patented June 26, 1934

1,964,327

UNITED STATES PATENT OFFICE 1,964,327

GRAIN DRAG RADDLE

Louis Mollenkamp, Arnold, Kans.

Application May 25, 1932, Serial No. 613,515

2 Claims. (Cl. 130—21)

This invention relates to what is known as a "grain drag raddle" and commonly used on threshing and harvesting combines for the separation of the grain from the chaff.

The difficulty with the raddle as now used is that the grain and chaff, as the grain is threshed by the cylinder pile up on that side of the raddle nearest to the end of the cylinder by which it is threshed, and from which it is fed on to the raddle resulting in a choking of the feed requiring the operator to slacken the speed of travel of the machine in order to allow the combine to thresh the grain properly.

In accordance with the present invention a raddle of the character above mentioned is provided and equipped with means which serves to evenly distribute the fresh grain over the raddle as it is received from the cylinder, thus avoiding the aforementioned undesirable "choke up" of the machine and the requisite slowing down of the speed of travel of the machine, as above mentioned is now required.

The invention together with its numerous objects and advantages will be best understood from a study of the following description, taken in connection with the accompanying drawings wherein.

Figure 1:
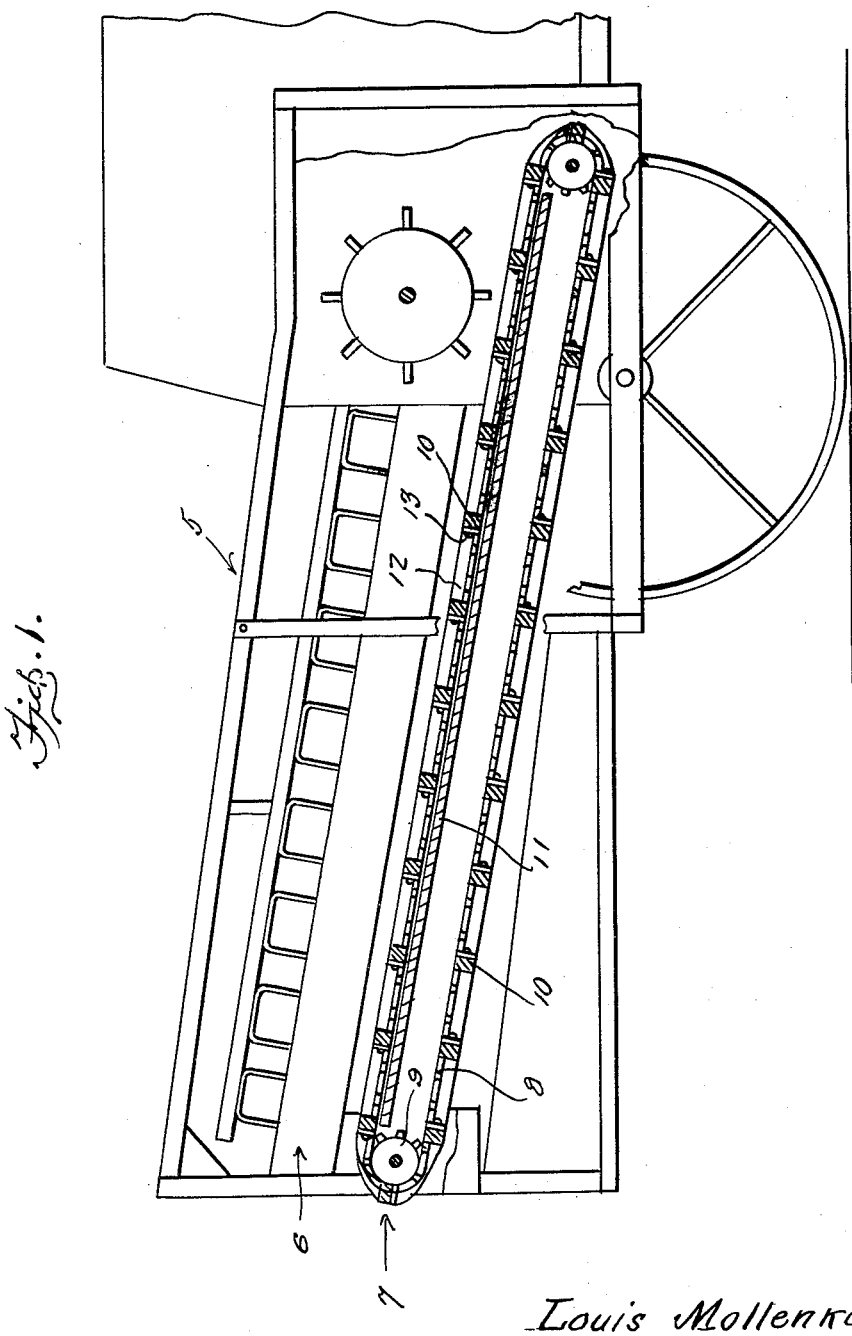
Figure 1 is a fragmentary sectional elevational view through a threshing and harvesting combine showing the application of my invention thereto.

Referring more in detail to the drawings, 5 designates generally a portion of a well known type of threshing and harvesting combine, the same embodying among other parts a straw rack 6 which directly receives the straw after the heads have been knocked from the head of the grain by reason of the threshing cylinder, and this straw rack moves the mass toward the back of the machine, and as the mass passes toward the back of the machine the grain and chaff fall through the straw rack upon the grain drag raddle designated generally by the reference character 7 and located directly beneath the straw rack as shown. Usually, and as shown, the grain drag raddle includes the endless side chains 8 trained over sprockets 9 and connected by rigid cross slats 10; and the endless chain and slats provide an endless conveyor, the upper run of which moves over an inclined imperforate plate 11 of metal or other suitable material, the plate 11 receiving the grain and chaff from the straw rack 6 as is apparent. The foregoing is conventional and is not of the essence of this invention.

As stated hereinbefore, by reason of the feed of the straw from the cylinder to the straw rack, the chaff and grain passing from the straw rack on to the grain drag raddle has a tendency to pile up along one side of the pan or plate portion 11 of the raddle 7 causing a choking up retarding efficient operation of the machine.

In accordance with the present invention means is provided whereby the grain and chaff falling on to the member 11 of the raddle 7 will have a tendency to spread out over the raddle and thus avoid this objectionable choking up. To this end the grain drag raddle, in accordance with the present invention is provided with flexible auxiliary slats 12 extending between the slats 10 and disposed diagonally.

Figure 2:
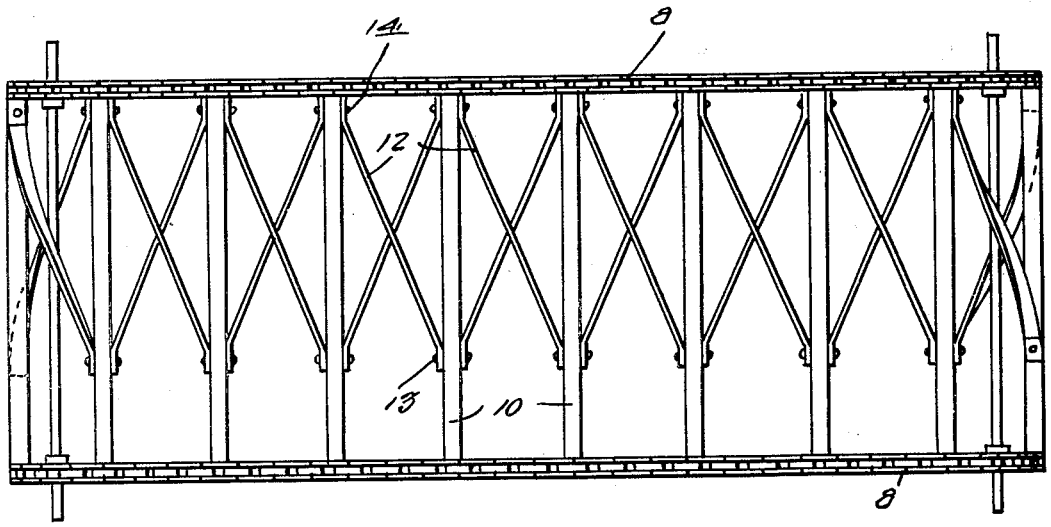
Figure 2 is a top plan view of a raddle embodying the features of the present invention.

Referring to Figure 2 it will be seen that the slats 12 are arranged in alternate relation relative to the slats 10, and each slat 12 is riveted or otherwise secured as at 13, and at one end thereof to a forward slat 10, (reference being had to the direction of movement of the conveyor) inwardly from one end of said forward or leading slat 10, while the other end of said slat 12 is similarly secured as at 14 to a trailing or rearward slat 10 at that end of the trailing slat 10 adjacent an endless chain 8 so that the slat 12 extends diagonally between a pair of slats 10. These slats 12 being flexible it will be seen that it will in no wise interfere with the travel of the conveyor, and by reason of the diagonal arrangement will tend to cause the chaff and grain falling on to the plate 11 of the raddle to spread out evenly over the plate 11 during travel of the conveyor.

Figure 3:
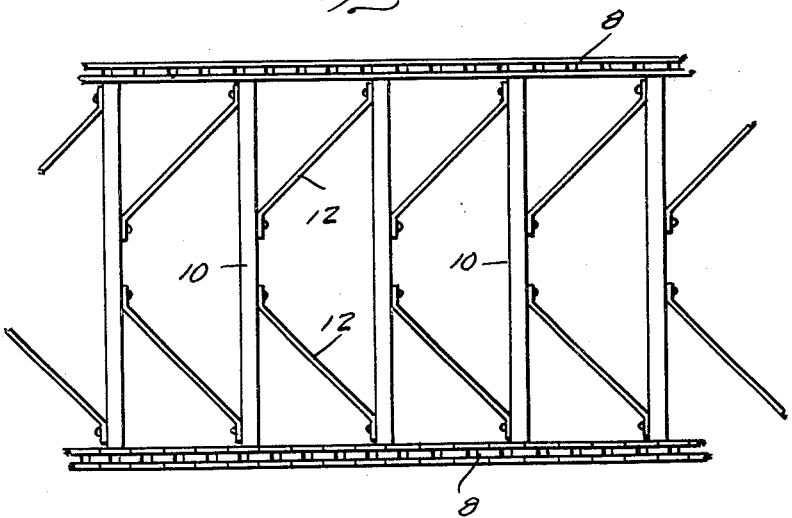
Figure 3 is a fragmentary plan view of one flight of a slightly modified form of raddle and Figure 4 is a perspective view of a flexible flap embodying the features of the present invention.
Figure 4:
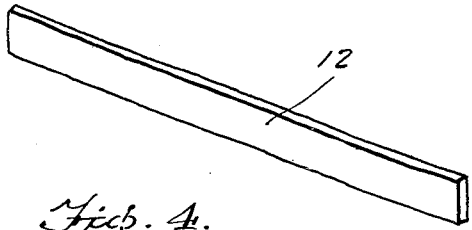

In the form of the invention shown in Figure 3 instead of one flexible slat secured between each pair of slats 10 two such flexible slats are employed and in this connection it will be seen that the flexible slats are arranged diagonally and each flexible slat at their converging end are suitably secured to one of the slats 10 inward from the end of said one slat, while at their diverging end the flexible slats are secured to a leading slat 10 adjacent the end of such leading slat.

Even though I have herein shown and described the preferred embodiment of the invention, it is to be understood that the same is susceptible of further changes, modification and improvements coming within the scope of the appended claims.

Having thus described my invention, what I claim as new is:

1. In a threshing and harvesting combine, a straw rack, a grain drag raddle beneath said straw rack and including a plate member paralleling said straw rack, and an endless conveyor having the top flight thereof movable over said plate like member, and said conveyor including relatively rigid transverse slats and flexible slats arranged diagonally of the conveyor, and supported between and connected to pairs of the transverse slats.

2. A grain drag raddle including in combination a pair of endless sprocket chains, relatively rigid transverse slats connecting said chains, and flexible slats extending between and connected to the transverse slats, said flexible slats being arranged in pairs and extending diagonally.

LOUIS MOLLENKAMP.